United States Patent Office 2,913,601
Patented Nov. 17, 1959

2,913,601

BUS BAR POWER CHANNEL

Kenneth Losch, Penn Township, Allegheny County, and Edward A. Petrocelli, Shaler Township, Allegheny County, Pa., assignors to Westinghouse Electric Corporation, East Pittsburgh, Pa., a corporation of Pennsylvania Application April 5, 1957, Serial No. 651,085

8 Claims. (Cl. 307—147)

This invention relates to bus bars in general and in particular to bus bar power channels.

In the field of logic element art, much has been done in encapsulating logic element components in cases or blocks of plastic to protect the components from tampering, shock and abrasion. On the other hand, provisions for making power connections to these encapsulated logic element units have preceded along conventional lines of long standing with the attendant problems of proper phasing of power supply voltage, individual wiring, trouble shooting power failures in these wires and the inflexibility of the connections once made.

An object of this invention is to produce power supply connections for encapsulated logic element units or other electrical devices having a plurality of power supply connections by the use of a bus bar power channel.

Another object of this invention is to provide power supply connections for encapsulated logic element units or other electrical devices having a plurality of power supply connections, wherein the phase angle of the logic element unit or of other electrical devices with respect to the power supply can be changed by 180° rotation of the logic element unit or other electrical device.

It is a further object of this invention to provide power supply connections for encapsulated logic element units or other electrical devices having a plurality of power supply connections wherein the maximum flexibility of a plug-in unit and mechanical locking are combined.

Other objects of the invention will in part be obvious and will in part appear hereinafter.

The invention accordingly comprises the features of construction, combinations of elements, and arrangements of parts which will be exemplified in the construction hereinafter set forth, and the scope of the application of which will be indicated in the claims.

For a fuller understanding of the nature and objects of the invention, reference should be had to the following description taken in connection with the accompanying drawings, in which.

Figure 1:
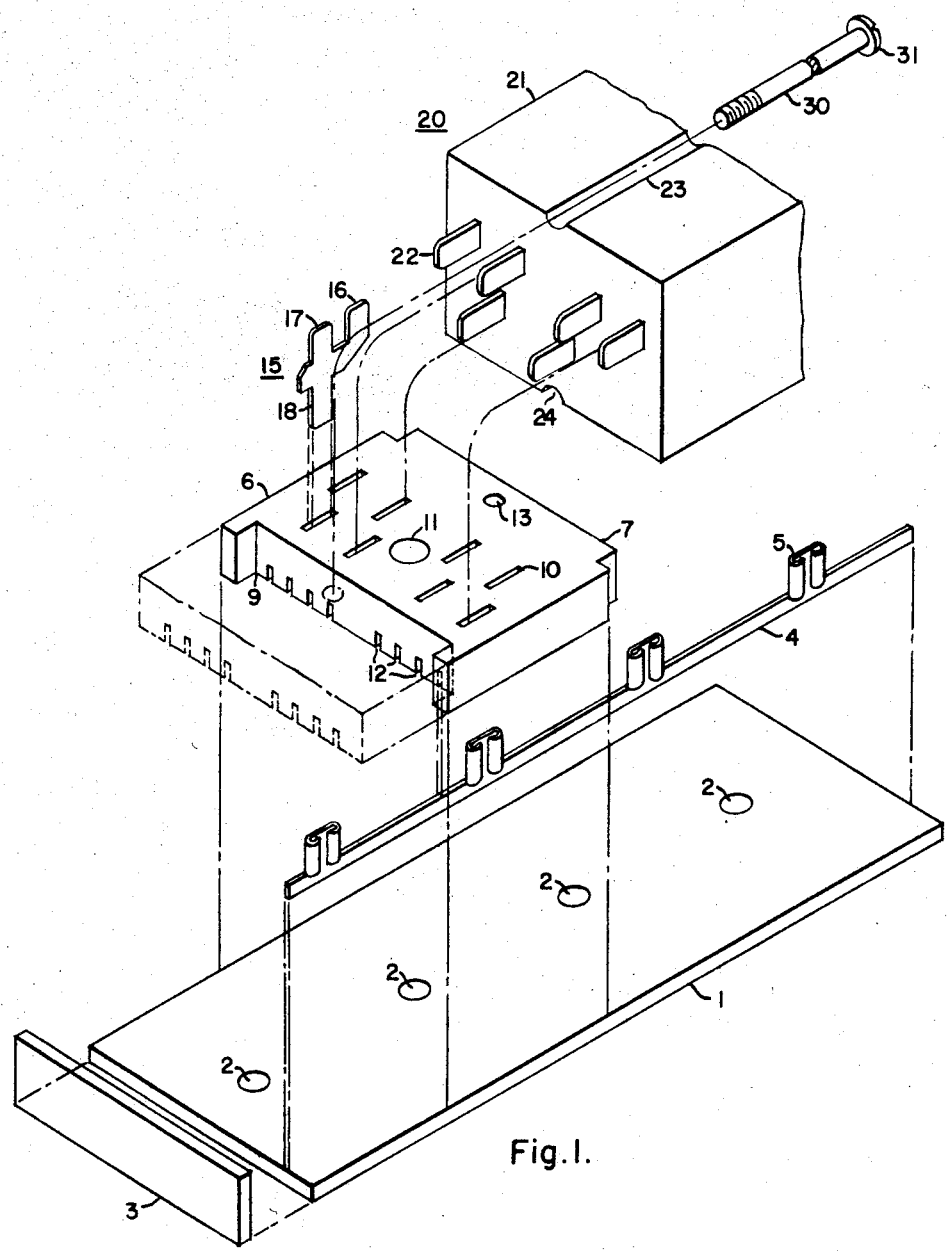
Figure 1 is an exploded view in perspective of a bus bar power channel illustrating this invention.
Figure 2:
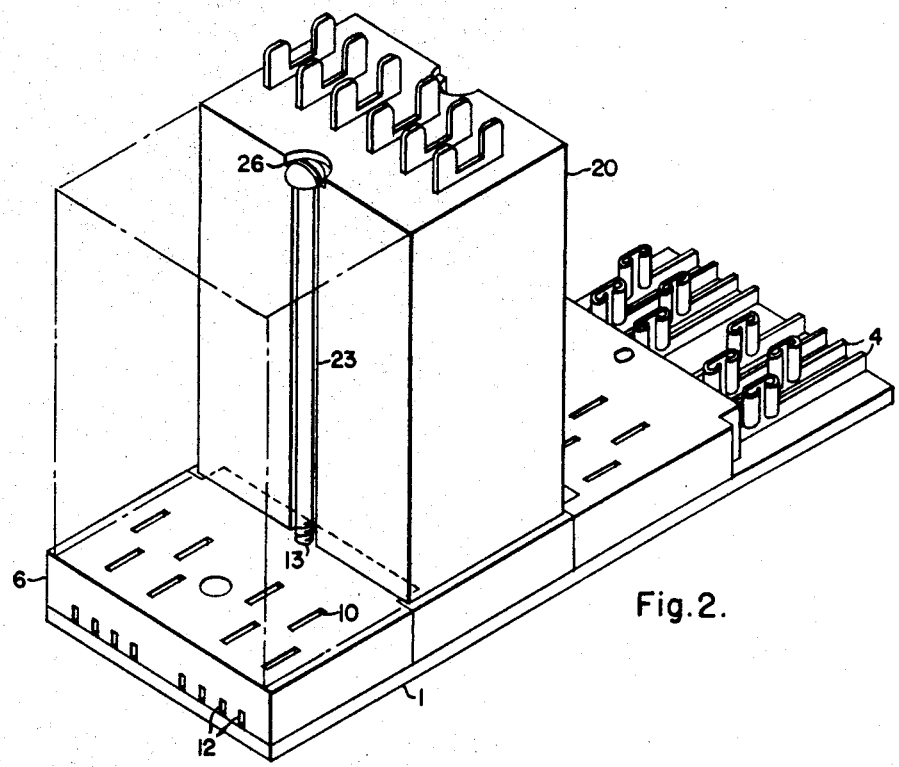
Fig. 2 is a view in perspective of the assembled bus bar power channel, and attached encapsulated logic unit, with a spacing member removed.

Referring to Fig. 1, there is illustrated an exploded view of a bus bar power channel embodying the teachings of this invention. Fig. 2 is a perspective view of the assembled bus bar power channel and engaged encapsulated logic element unit. An individual spacing member has been removed to show the arrangement of the bus bar members inside the assembly.

The bus bar power channel is made up of three main parts, the base member 1, the metal bus bar members 4, and the insulating spacing members 6. In this particular embodiment, the base member 1 is of rectangular shape and formed from any suitable insulating material.

The metal bus bars 4 are stamped from any suitable conductive material and are of uniform cross-section throughout their length. In the embodiment shown in Fig. 1, the female terminals 5 of bus bar member 4 have been formed from the same piece of metal as the bus bar 4 at the same time the bus bar 4 was stamped. The spacing member 6 is formed from insulating material and has a protrusion 7 on one side and a recess 9 on the other side for alignment with other individual spacing members. The spacing members 6 are formed with openings 10 that are designed to register with the female terminals 5 of the bus bar members 4. In Fig. 1, only one bus bar element 4 has been shown; however, there are 8 bus bar members which fit into the slots 12 of spacing member 6. Perforation 11 of spacing member 6 is designed to align with perforation 2 of base member 1 for purposes of attaching the bus bar power channel to a control panel. The spacing members 6 may be attached to base member 1 with screws, clamps, glue or any other suitable means.

It is to be understood that instead of individual spacing members 6 a complete elongated spacing member combining the features of the individual spacing members may be formed of any desired length. These bus bar power channels may be manufactured in standard lengths and then cut to the desired length with any general purpose saw.

End plate 3 is an optional addition for protecting the exposed ends of the bus bar power channels. Connector 15 constitutes an illustrative example of a connection between the power supply and the bus bar power channel. The power supply connections are made to upper lobes 16 and 17 of connector 15. Terminal 18 is to be inserted in the appropriate opening 10 of spacing member 6 wherein it engages female terminal 5 of the bus bar 4.

The base and power supply terminals of an encapsulated logic element unit are shown generally at 20. The body 21 in the embodiment shown carries the power supply terminals 22 on the base. In the sides of the body 21 of the unit 20 there are grooves 23 and 24. These grooves are of sufficient size to permit insertion of a locking screw 30 between two encapsulated logic element units when the units are plugged into adjacent individual spacing members 6.

The head 31 of locking screw 30 is brought to rest on the countersunk portion 26 of groove 23 as the threaded portion of the locking screw 30 is introduced into tapped screw hole 13 provided in individual spacing member 6, mechanically locking the unit in place. Thus, we have the maximum flexibility of a plug-in unit combined with the advantage of mechanical locking.

Figure 3:
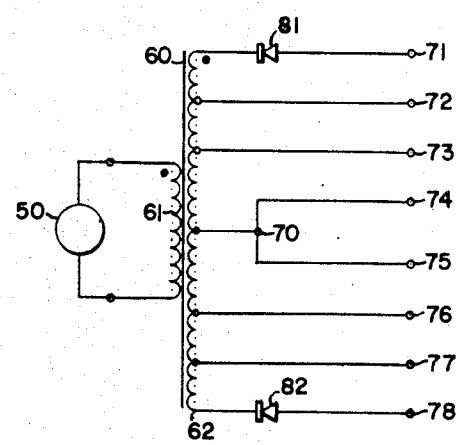
Fig. 3 is a schematic diagram of a transformer circuit suitable for use with this invention.

Fig. 3 is a schematic diagram of a transformer circuit that would be suitable for use with this invention. An alternating current source 50 is suitably connected to the primary winding 61 of transformer 60. Secondary winding 62 of transformer 60 is provided with seven taps, center tap 70, end taps 71 and 78, and intermediate taps 72, 73, 76 and 77. Center tap 70 is connected to terminals 74 and 75. We now have the eight channels for the bus bar power channel of the embodiment shown in Fig. 1 and Fig. 2.

If center tap 70 (i.e. terminals 74 and 75) is to be used as the common or ground it will be noted that when terminal 71 is positive going with respect to ground or common 70, terminal 78 is negative going with respect to ground and the two voltages are 180° out of phase with each other. Similarly terminals 72 and 77 and terminals 73 and 76 will deliver voltages that are 180° out of phase. The addition of rectifier 81 in series circuit relationship between terminal 71 and one end of secondary winding 62 of transformer 60 and the addition of rectifier 82 in series circuit relationship between terminal 78 and the other end of secondary winding 62 of transformer 60 will give a constant polarity source at the terminals 71 and 78 with respect to center tap 70. Desired intermediate values of positive and negative voltages are obtained at terminals 72 and 73 and terminals 76 and 77, respectively. The connections from this transformer circuit are made to suitable power supply connectors 15 as denoted in Fig. 1 and explained hereinbefore.

In conclusion, it is pointed out that the illustrated example constitutes a preferred embodiment of our invention. We do not limit ourselves to the exact details shown since modifications of the same may be varied without departing from the spirit of the invention.

We claim as our invention:

1. In combination; a plurality of spaced and substantially parallel metal bus bar members; each said bus member being provided at corresponding intervals throughout its length with laterally extending female terminals formed from the same piece of metal as said bus member; a spacing and insulating member having a plurality of slots formed in one side to receive and align said bus bar members; said spacing member having formed therethrough openings registering with said female terminals and aligning said female terminals in parallel; a base support member attached to said spacing member whereby said bus members are held in said slots formed in said spacing member.

2. In combination; a plurality of spaced and substantially parallel metal bus bar members; each said bus member being provided at corresponding intervals throughout its length with laterally extending female terminals formed from the same piece of metal as said bus member; a spacing and insulating member having a plurality of slots formed in one side to receive and align said bus bar members; said spacing member having formed therethrough openings registering with said female terminals and aligning said female terminals in parallel; a base support member attached to said spacing member whereby said bus members are held in said slots formed in said spacing member; an electrical circuit mounted within an encapsulating member; said electrical circuit adapted to receive electrical power from a plurality of male terminals carried on the base of said encapsulating member; said male terminals being disposed on said base to align with and plug into said female terminals; a tapped screw hole formed in said spacing member; a locking screw having means adapted to bear upon said encapsulating member, when said male and female terminals are engaged, as said screw is introduced into said screw holes.

3. In combination; a plurality of spaced and substantially parallel metal bus bar members; each said bus member being provided at corresponding intervals throughout its length with laterally extending female terminals formed from the same piece of metal as said bus member; a spacing and insulating member having a plurality of slots formed in one side to receive and align said bus bar members; said spacing member having formed therethrough openings registering with said female terminals and aligning said female terminals in parallel; a base support member attached to said spacing member whereby said bus members are held in said slots formed in said spacing member; a power supply transformer having a secondary winding with a plurality of taps; said taps including a center tap and at least one pair of intermediate taps having a tap on each side of said center tap; means connecting said center tap to at least one bus member; means connecting each said intermediate tap to a bus member; said intermediate tap connected bus members being symmetrically disposed with respect to said center tap connection; said pair of intermediate taps in cooperation with said center tap providing two voltages substantially the same in magnitude and 180° out of phase.

4. In combination; a plurality of spaced and substantially parallel metal bus bar members; each said bus member being provided at corresponding intervals throughout its length with laterally extending female terminals formed from the same piece of metal as said bus member; a spacing and insulating member having a plurality of slots formed in one side to receive and align said bus bar members; said spacing member having formed therethrough openings registering with said female terminals and aligning said female terminals in parallel; a base support member attached to said spacing member whereby said bus members are held in said slots formed in said spacing member; an electrical circuit mounted within an encapsulating member; said electrical circuit adapted to receive electrical power from a plurality of male terminals carried on the base of said encapsulating member; said male terminals being disposed on said base to align with and plug into said female terminals; a tapped screw hole formed in said spacing member; a locking screw having means adapted to bear upon said encapsulating member, when said male and female terminals are engaged, as said screw is introduced into said screw holes; a power supply transformer having a secondary winding with a plurality of taps; said taps including a center tap and at least one pair of intermediate taps having a tap on each side of said center tap; means connecting said center tap to at least one bus member; means connecting each said intermediate tap to a bus member; said intermediate tap connected bus members being symmetrically disposed with respect to said center tap connection; said pair of intermediate taps in cooperation with said center tap providing two voltages substantially the same in magnitude and 180° out of phase; said male terminals of said encapsulating member and said female terminals being so disposed that said male terminals may be engaged with said female terminals when said encapsulating member is in one of two positions.

5. In combination; a plurality of spaced and substantially parallel metal bus bar members; each said bus member being provided at corresponding intervals throughout its length with laterally extending female terminals formed from the same piece of metal as said bus member; a spacing and insulating member having a plurality of slots formed in one side to receive and align said bus bar members; said spacing member having formed therethrough openings registering with said female terminals and aligning said female terminals in parallel; a base support member attached to said spacing member whereby said bus members are held in said slots formed in said spacing member; an electrical circuit mounted within an encapsulating member; said electrical circuit adapted to receive electrical power from a plurality of male terminals carried on the base of said encapsulating member; said male terminals being disposed on said base to align with and plug into said female terminals; a tapped screw hole formed in said spacing member; a locking screw having means adapted to bear upon said encapsulating member, when said male and female terminals are engaged, as said screw is introduced into said screw holes; a power supply transformer having a secondary winding with a plurality of taps; said taps including a center tap and at least one pair of intermediate taps having a tap on each side of said center tap; means connecting said center tap to at least one bus member; means connecting each said intermediate tap to a bus member; said intermediate tap connected bus members being symmetrically disposed with respect to said center tap connection; said pair of intermediate taps in cooperation with said center tap providing two voltages substantially the same in magnitude and 180° out of phase; said male terminals of said encapsulating member and said female terminals being so disposed that said male terminals may be engaged with said female terminals when said encapsulating member is in one of two positions; said two positions being 180 circular degrees apart with respect to an axis perpendicular to said base of said encapsulating member.

6. In combination; a plurality of spaced and substantially parallel metal bus bar members; each said bus member being provided at corresponding intervals throughout its length with laterally extending female terminals formed from the same piece of metal as said bus member; a plurality of spacing and insulating members; each said spacing member having a plurality of slots formed in one side to receive and align said bus bar members; each said spacing member having formed therethrough openings registering with said female terminals; each said spacing member having a protrusion on one end and a recess on the other end for lateral alignment purposes with other said spacing members; a support member attached to said plurality of spacing members whereby said bus members are held in said slots; a corresponding encapsulating member for each said spacing member; each said encapsulating member having mounted therein an electrical circuit adapted to receive electrical power from a plurality of male terminals carried on the base of said encapsulating member; said male terminals being disposed on said base to align with and plug into said female terminals within said corresponding spacing member; a tapped screw hole formed in each spacing member; and a locking screw having means adapted to bear adjacently engaged encapsulating members as said screw is introduced into said screw hole.

7. In combination; a plurality of spaced and substantially parallel metal bus bar members; each said bus member being provided at corresponding intervals throughout its length with laterally extending female terminals formed from the same piece of metal as said bus member; a spacing and insulating member having a plurality of slots formed in one side to receive and align said bus bar members; said spacing member having formed therethrough openings registering with said female terminals and aligning said female terminals in parallel; some of said openings through the spacing member and the female terminals registering therewith being in a row extending transversely of the length of the bus bar members, and other of said openings through the spacing member and the female terminals registering therewith being in a second row extending transversely of the length of the bus bar members; a base support member attached to said spacing member whereby said bus members are held in said slots formed in said spacing member.

8. In combination; a plurality of spaced and substantially parallel metal bus bar members; a spacing and insulating member having a plurality of slots formed in one side to receive and align said bus bar members; said spacing member having formed therethrough openings registering with said bus bar members; some of said openings through the spacing member being in one row extending transversely of the length of the bus bar members, other of said openings through the spacing member being in a second row extending transversely of the length of the bus bar members, and said openings in the second row registering with different bus bar members than the openings in said one row; a base support member attached to said spacing member whereby said bus members are held in said slots formed in said spacing member.

References Cited in the file of this patent

UNITED STATES PATENTS

| | | |
|---|---|---|
| 848,505 | Steinberger | Mar. 26, 1907 |
| 2,634,312 | Batcheller | Apr. 7, 1953 |
| 2,766,405 | Edmunds | Oct. 9, 1956 |